(12) United States Patent
Grosse-Plankermann et al.

(10) Patent No.: US 8,523,585 B2
(45) Date of Patent: Sep. 3, 2013

(54) LINE SYSTEM

(75) Inventors: Peter Grosse-Plankermann, Neu Wulmstorf (DE); Dieter Plehn, Hamburg Bergedorf (DE); Hans-Juergen Poerschke, Jork (DE)

(73) Assignee: Airbus Operations GmbH, Hamburg (DE)

( * ) Notice: Subject to any disclaimer, the term of this patent is extended or adjusted under 35 U.S.C. 154(b) by 176 days.

(21) Appl. No.: 13/116,596

(22) Filed: May 26, 2011

(65) Prior Publication Data

US 2011/0294319 A1 Dec. 1, 2011

Related U.S. Application Data

(60) Provisional application No. 61/349,262, filed on May 28, 2010.

(30) Foreign Application Priority Data

May 28, 2010 (DE) .......................... 10 2010 021 919

(51) Int. Cl.
*H01R 4/60* (2006.01)
(52) U.S. Cl.
USPC .................. 439/214; 439/682; 244/118.5
(58) Field of Classification Search
USPC ........................ 439/212, 214, 682; 244/118.5
See application file for complete search history.

(56) References Cited

U.S. PATENT DOCUMENTS

| | | | | |
|---|---|---|---|---|
| 3,015,082 A | * | 12/1961 | Meacham | 439/212 |
| 3,744,002 A | * | 7/1973 | Weimer et al. | 174/71 B |
| 7,063,562 B2 | * | 6/2006 | Henley et al. | 439/502 |
| 7,389,960 B2 | * | 6/2008 | Mitchell et al. | 244/118.5 |
| 7,909,663 B1 | * | 3/2011 | Bouffet | 439/787 |
| 7,967,622 B2 | * | 6/2011 | Brutsch et al. | 439/212 |
| 2005/0211835 A1 | | 9/2005 | Henley et al. | |
| 2005/0230543 A1 | | 10/2005 | Laib et al. | |

FOREIGN PATENT DOCUMENTS

DE 102004045964 4/2006

* cited by examiner

*Primary Examiner* — Hien Vu
(74) *Attorney, Agent, or Firm* — Wood, Herron & Evans, LLP

(57) ABSTRACT

A line system for an aircraft cabin has a line channel with a first surface and a second surface facing in an opposite direction with respect to the first surface. The line system also includes at least one conductor running in the line channel a plurality of first plug channels which enable contacting of the at least one conductor through the first surface, and at least one second plug channel which enables contacting of the at least one conductor through the second surface. At and at least one connector plug with an elongated contact pin which contacts the at least one conductor through the second plug channel, the contact pin having a first section situated in the second plug channel and a second section situated outside the second plug channel.

20 Claims, 3 Drawing Sheets

LINE SYSTEM

TECHNICAL FIELD

The invention relates to a line system, in particular in an aircraft cabin, with a line channel and at least one conductor running in the line channel.

BACKGROUND

The prior art discloses cable channels (so-called raceways) which are laid on the floor of an aircraft cabin and have cables running in them, via which electronic devices integrated into the passenger seats, such as so-called passenger entertainment systems (PES) and lighting means, are supplied with energy and data. In particular, it is known to install on the floor under a passenger seat a so-called seat electronic box (SEB) which is connected to the cable running in the cable channel in order to supply one or a group of passenger seats with energy and data. Seat electronic boxes decode, inter alia, audio and video data received via the cable running in the cable channel and pass the data on to the passenger entertainment systems integrated in the passenger seats for output to the passengers.

In the case of the known cable channels, however, it is a disadvantage that the supply of energy and data from an energy source and a data source to the cable running in the cable channel takes place via a supply cable which is laid on the floor of the aircraft cabin separately from the cable channel. In order that the supply cable does not lie exposed in the aircraft cabin, it is laid on the aircraft cabin floor under the fitted carpet. Consequently, the supply cable has to be laid as early as during the stage when the cabin is fitted out, i.e. before the fitted carpet is laid. However, this makes it more difficult to subsequently change the orientation/length of the supply cable or replace a defective supply cable. Moreover, the course of the supply cable under the fitted carpet, in particular transversely with respect to aisles between seat rows, gives rise to undulations or unevenness in the fitted carpet, which in emergency situations may hinder the passengers and cabin crew.

Airlines have an interest in being able to change the arrangement of passenger seats in an aircraft cabin. In particular, the arrangement of passenger seats is to be changeable in such a way that the spacing between the passenger seats can be increased or reduced towards the front and towards the rear. If the positions of the passenger seats in the aircraft cabin are changed, the seat electronic boxes installed under the passenger seats and the new passenger seat positions must also be adapted. Since the seat electronic boxes are connected to the cable running in the cable channel, the cable lengths must furthermore be adapted to the new arrangement of passenger seats or new cable channels with changed cable outlet openings must be installed in the aircraft cabin.

A cable channel with modular cable routing elements and cable outlet elements is known from the document DE 10 2004 045 964 A1. Cables running in the cable channel can be routed to a passenger seat via the cable outlet elements. In the case of this cable channel, however, it is a disadvantage that when the arrangement of passenger seats is changed the number and positions of the cable routing elements and cable outlet elements has to be redetermined, which is relatively time-consuming. Moreover, the lengths of the cables running in the cable channel must also be adapted to the new arrangement of passenger seats. Furthermore, a time-consuming assembly of the cable routing elements and cable outlet elements in the cable channel is necessary.

The invention is directed at the object of providing a line system, in particular in an aircraft cabin, which enables a simple and time-saving adaptation to different connecting configurations.

SUMMARY OF THE INVENTION

To achieve this object, a line system, in particular in an aircraft cabin, is provided, which has a line channel with a first surface and a second surface facing in an opposite direction with respect to the first surface, at least one conductor running in the line channel, a plurality of first plug channels which enable contacting of the at least one conductor through the first surface, at least one second plug channel which enables contacting of the at least one conductor through the second surface, and at least one connector plug with an elongated contact pin which contacts the at least one conductor through the second plug channel. The elongated contact pin has a first section or portion situated in the second plug channel and a second section or portion situated outside the second plug channel.

Preferably, the first surface of the cable channel lies in the interior of the aircraft cabin and the second surface of the cable channel lies on the floor or a fitted carpet laid in the aircraft cabin. The line system according to the invention is distinguished in that the conductor can be contacted via the plurality of first plug channels at a multiplicity of locations. If, for example, a seat electronic box installed under a passenger seat in an aircraft cabin is connected via a first plug channel to the conductor running in the line channel, when the position of the passenger seat is changed towards the front or towards the rear the seat electronic box can be connected via another first plug channel to the conductor running in the line channel. In doing so, there is no need to change or replace the line channel or the conductor.

The cable running in the line channel can be supplied with energy and data from an energy source and a data source via the connector plug. Since the connector plug has an elongated contact pin, a supply of energy and data to the connector plug via a supply cable running on the floor under the fitted carpet can be avoided. In addition to the data supply, bidirectional data communication may also take place.

In order, furthermore, to avoid a supply of the conductor running in the line channel with power and data via a supply cable running on the floor under the fitted carpet, the section of the elongated contact pin situated outside the second plug channel may be longer than the section situated in the second plug channel. This condition may apply particularly when one end of the section of the contact pin situated inside the second plug channel contacts the at least one conductor. In order for the supply to be able to take place from below the interior of the aircraft cabin, the section of the elongated contact pin situated outside the second plug channel may furthermore be at least twice as long as the section situated in the second plug channel. Preferably, the section of the elongated contact pin situated outside the second plug channel is at least three times as long as the section situated in the second plug channel.

In order for the supply of energy and data to the line running in the line channel to be made independent of the interior of the aircraft cabin, the line system may furthermore have a floor panel, on the upper side of which the line channel lies with its second surface, the elongated contact pin of the connector plug extending through the floor panel to the conductor. For this purpose, the floor panel may have a bore. The supply of energy and data from an energy source and a data source to the conductor running in the line channel may thus take place via a cavity situated below the floor panel. As a result, supply cabling in the interior of the aircraft cabin below the fitted carpet can be avoided. Furthermore, replacement of defective supply cables is simplified, since the fitted carpet does not have to be removed for access to the supply cable.

In order for the connector plug to be able to be connected in a simple manner to the line running in the line channel and furthermore for reliable contacting of the conductor to be ensured, the connector plug may have a plug body with a bearing surface which lies against the underside of the floor panel, the elongated contact pin projecting from the bearing surface and the length of the contact pin section situated outside the second plug channel corresponding to the thickness of the floor panel. Thus, the connector plug can be plugged with its elongated contact pin from below through a corresponding bore in the floor panel into the second plug channel. This dimensioning of the length of the contact pin enables precise contacting of the conductor and a firm hold of the connector plug in the line channel. In particular, the connector plug can be positively and/or non-positively held in the second plug channel.

According to a preferred embodiment of the present invention, the line system has a supply line which runs below the floor panel and feeds the conductor with power and/or data via the connector plug. For this purpose, the supply line may be connected to a central power and data source. The data can be supplied to the conductor running in the line channel, in particular with the aid of a bus system. Bidirectional data communication is likewise possible. The supply line may be, for example, a cable which is connectable to the part of the connector plug situated below the floor panel. For this purpose, the cable may have corresponding plugs.

With further preference, the connector plug has a supply conductor which is formed as a pin and is arranged on the side of the connector plug facing away from the contact pin. The power and data supply line may be connected to the connector plug via the supply conductor formed as a pin. In particular, the supply conductor may be formed as a curved pin and curved in a direction from which the power and data supply line feeds the connector plug with power and/or data. As a result, the required installation depth of the connector plug can be reduced, thereby making it possible for the connector plug also to be inserted in a cavity with a low height under the floor panel.

The supply conductor of the connector plug formed as a curved pin may furthermore be partly insulated, so that a safe connection to the power and data supply line is made possible. In particular, the supply conductor may be formed as a spring-loaded pin, thereby ensuring reliable contacting of the connector plug by the power and data supply line even in the case of shaking or vibration. For instance, shaking or vibration occurs particularly during take-off and landing of aircraft, and may cause the power and data supply line to become detached from the connector plug. With the aid of the spring-loaded pin, it is possible to compensate for such shaking or vibration at the connector plug.

To make possible a time-saving rearrangement of passenger seats in the interior of the aircraft cabin, the plurality of first plug channels may be arranged at equal spacings along the line channel. As a result, in particular, measuring and drilling of plug channels in the line channel can be avoided. If, for example, an airline desires all the passenger seats of economy class to have greater spacing from the respective front seat, then for all the passenger seats corresponding first plug channels which are further away can be used for the contacting of the conductor running in the conductor channel from the interior of the aircraft cabin, without remeasuring. This change may take place in particular by unplugging a plug from and plugging it into the first plug channels.

In order for reliable contacting of the conductor running in the line channel from below the floor panel by the connector plug and from the interior of the aircraft cabin to be ensured, the conductor may have a substantially rectangular cross-section, the long sides of which are parallel to the second surface of the line channel. As a result of the rectangular cross-section, the contact area of the conductor accessible from above and below is increased, whereby faulty contacts can be avoided.

According to a further-preferred embodiment of the present invention, the line system furthermore has an electronic box for a passenger seat with at least one connector pin, the at least one connector pin detachably contacting the conductor through the first plug channel. The electronic box is preferably a seat electronic box. Consequently, when the arrangement of passenger seats is changed, the connector pin together with the electronic box can be pulled out of one of the plurality of first plug channels and plugged into another of the plurality of first plug channels. Thus, individual contacting of the conductor running in the cable channel from the interior of the aircraft cabin is made possible without structural alteration of the cable channel, the cable, the connector plug or the supply line.

In order to minimise the hindrance of passengers due to the line channel running on the floor panel, the first surface may be of convex or plane form. Furthermore, the second surface may be of plane form. In particular, the second surface lies on the floor panel and the first surface faces the interior of the aircraft cabin.

For simple contacting of the at least one conductor, in particular by respective plugs from above and below, the first and/or the second plug channels may run substantially perpendicularly to the second surface.

In order to be able to supply both power and data to a plurality of passenger seats or electronic boxes for passenger seats, the at least one conductor running in the line channel may comprise a conductor rail running in the line channel and a data line running in the line channel, respective plug channels and connector plugs being provided for the conductor rail and the data line. It is thus possible to provide two connector plugs which, via respective supply lines, supply the conductor rail and the data line with power and data from a power and data source, respectively, from below the floor panel. Furthermore, the electronic box may have two connector pins for the passenger seat which detachably contact the conductor rail and the data line via respective first plug channels.

In order to make possible reliable contacting of the conductor rail and the data line from below the floor panel via the connector plugs and from the interior of the aircraft cabin, the conductor rail and data line may run parallel to one another in the cable channel and equidistantly from the second surface.

BRIEF DESCRIPTION OF THE DRAWINGS

Preferred exemplary embodiments of the present invention will now be explained in more detail with reference to the appended schematic figures, of which.

DETAILED DESCRIPTION

Figure 1:
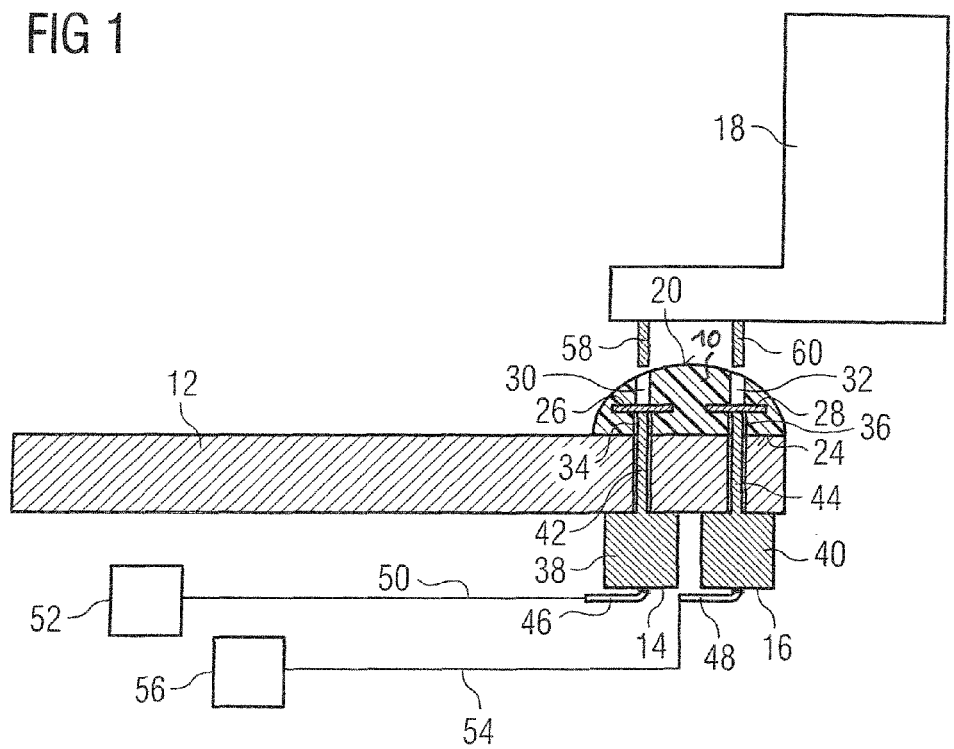
FIG. 1 shows a lateral sectional view of a first exemplary embodiment of a line system.
Figure 2:
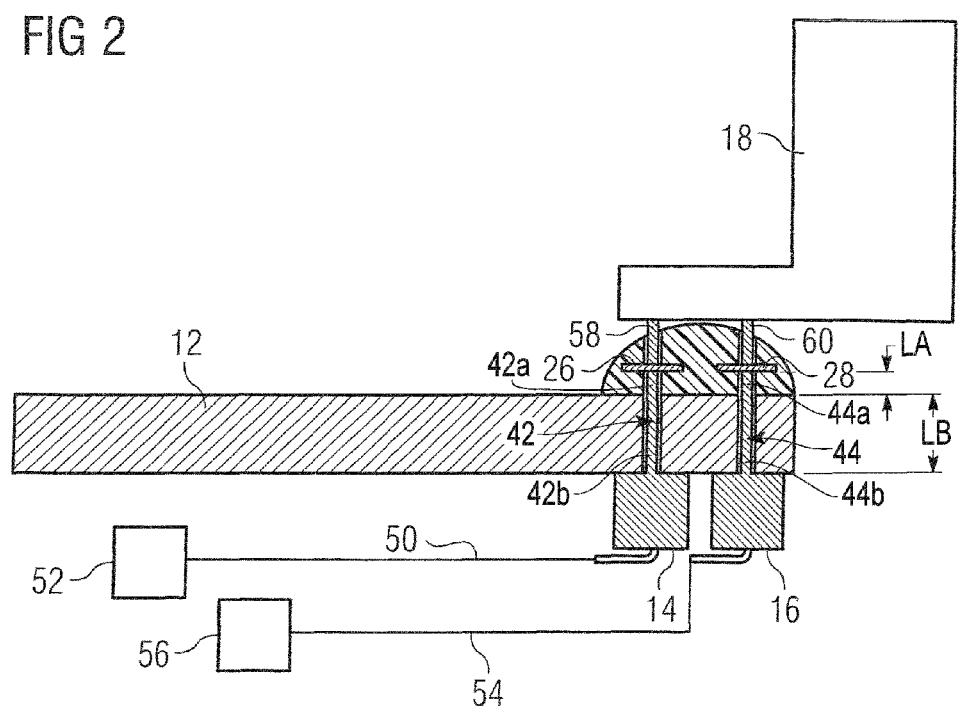
FIG. 2 shows a lateral sectional view of the line system of FIG. 1 with a plugged-in seat electronic box.

FIGS. 1 and 2 show lateral sectional views of a line system in an aircraft cabin shown schematically in a detail. The line system comprises a line channel 10, two connector plugs 14, 16 which can be plugged into the line channel 10 from below a floor panel 12 and a seat electronic box 18 which can be plugged into the line channel 10 from the interior of the aircraft cabin. FIGS. 1 and 2 differ in that in FIG. 1 the seat electronic box 18 is shown in an arrangement unplugged with respect to the line channel 10, whereas in FIG. 2 the seat electronic box 18 is plugged into the line channel 10 (for this reason, only some reference numbers, which are identical for the identical components in FIGS. 1 and 2, are repeated in both figures where necessary).

The line channel 10 is laid on the floor 12 of the aircraft cabin, for example fastened on a rail (not shown) or directly on the floor. The line channel 10 has a convex surface 20 which extends into the interior of the aircraft cabin. Furthermore, the line channel 10 has a second surface 24 lying on the floor panel 12. The line channel 10 extends perpendicularly to the image plane shown in FIGS. 1 and 2 and preferably consists of a lightweight, but loadable plastics material. Preferably, the first surface 20 directed into the interior of the aircraft cabin has no edges, so that little dirt can collect on the cable channel 10 and moreover passengers cannot catch their feet on the cable channel 10 or trip up.

Running in the cable channel 10 along the direction in which it extends are a conductor rail 26 and a data line 28. The conductor rail 26 and the data line 28 run substantially parallel to one another and to the second surface 24. In particular, the conductor rail 26 and the data line 28 have a flat, rectangular cross-section. The long sides of the rectangular cross-section run parallel to the second surface 24. The conductor rail 26 and the data line 28 may be, in particular, cables. The conductor rail 26 and the data line 28 are guided in the cable channel 10 by corresponding holders or recesses. In particular, further recesses (not shown in FIGS. 1 and 2) may be provided for weight reduction of the cable channel 10.

For contacting the conductor rail 26 and the data line 28 from above from the interior of the aircraft cabin, the line channel 10 has two first plug channels 30 and 32, through which contacting of the conductor rail 26 and the data line 28 is made possible via the first surface 20. Furthermore, the line channel 10 has two second plug channels 34 and 36 for contacting the conductor rail 26 and the data line 28 from below via the second surface 24. The first plug channels 30 and 32 and the second plug channels 34 and 36 extend substantially in a direction perpendicular to the second surface 24. In particular, the first and second plug channels 30, 32, 34, 36 run parallel to one another in the line channel 10, a direct passage between the first surface 20 and the second surface 24 being freed when the conductor rail 26 and data line 28 are removed from the line channel 10. The first and second plug channels 30, 32, 34, 36 may be bores. Removable closures (not shown) may additionally be provided in the first plug channels 30 and 32 in the arrangement of the seat electronic box 18 shown in FIG. 1, which closures prevent dirt from penetrating into the line channel 10 from the interior of the aircraft cabin.

The connector plugs 14 and 16 have plug bodies 38 and 40, elongated contact pins 42 and 44 and supply conductors 46 and 48. The plug bodies 38 and 40 have respective bearing surfaces which bear against the underside of the floor panel 12. Contact pins 42 and 44 extend from the centre of the bearing surfaces through respective bores in the floor panel 12 and the second plug channels 34 and 36 to the conductor rail 26 and the data line 28. The contact pins 42 and 44 contact the conductor rail 26 and the data line 28, respectively. The contact pins 42 and 44 each have a first section 42a, 44a (also referred to as a first portion) which is situated in the second plug channels 34 and 36, and a second section 42b, 44b (also referred to as a second portion) which is situated outside the second plug channels 34 and 36, i.e. between the second plug channels 34 and 36 and the plug bodies 38 and 40 (see FIG. 2). The second sections 42b 44b of the elongated contact pins 42 and 44 situated outside the second plug channels 34 and 36 are longer than the first sections 42a, 44a of the elongated contact pins 42 and 44 situated inside the second plug channels 34 and 36, respective ends of the first sections 42a, 44a of the elongated contact pins 42 and 44 situated inside the second plug channels 34 and 36 contacting the conductor rail 26 and the data line 28, respectively. In particular, the second sections 42b44b of the elongated contact pins 42 and 44 situated outside the second plug channels 34 and 36 are at least twice as long, furthermore in particular at least three times as long, as the first sections 42a, 44a of the elongated contact pins 42 and 44 situated inside the second plug channels 34 and 36. FIG. 2 also illustrates an example of the relative first length LA of the first sections 42a, 44a and second length LB of the second sections 42b, 44b.

The supply conductors 46 and 48 of the connector plugs 14 and 16 are arranged at the end of the plug bodies 38 and 40 which is opposite the contact pins 42, 44. The supply conductors 46 and 48 are formed as partly insulated, curved pins. In particular, the supply conductors 46 and 48 are formed as spring-loaded pins (schematically shown in FIGS. 1 and 2). As a result, it is possible to compensate for shaking, or contact displacements caused by the shaking, at the supply conductor 46, 48.

The supply conductor 46 is connected to a power source 52 via a supply line 50. Furthermore, the supply conductor 48 is connected to a data source 56 via a supply line 54. The power source 52 may be any type of energy source which supplies the seat electronic box 18 with energy via the connector plug 14 and the conductor rail 26. The data source 56 may be any type of data source, for example a computer server which supplies via a bus system (not shown) the connector plug 16 and the data line 28 or the plugged-in seat electronic box 18 with information data such as audio and video data (e.g. films and music). The supply lines 50 and 54 furthermore have plug contacts (not shown) for contacting the supply conductors 46 and 48. Furthermore, bidirectional data communication between the seat electronic box 18 and the data source 56 is also possible.

The supply of the conductor rail 26 and data line 28, running in the line channel 10, with power and data, respectively, takes place from below the floor panel 12. The power source 52 and the data source 56 do not have to be arranged below the floor panel 12 here. Merely the supply lines 50 and 54 or the plug bodies 38 and 40 and the supply conductors 46 and 48 are situated in a cavity below the floor panel 22. The power source 52 and the data source 56 may also be arranged in the interior of the aircraft cabin. For this purpose, the supply lines 50 and 54 may be routed into the interior of the aircraft cabin at their ends facing away from the connector plugs 14 and 16.

For a line channel 10 with a conductor rail 26 and a data line 28, it is sufficient for only two connector plugs 38, 40 and two supply lines 50, 54 to be provided. Since the supply lines 50, 54 are routed below the floor panel 12, no cables need to be laid above the floor panel 12, in particular under a fitted carpet. Moreover, since no passengers are able to step on the cables, the service life of the cables is increased.

The seat electronic box 18 is arranged in the interior of the aircraft cabin under a passenger seat (not shown). The seat electronic box 18 has on its underside two connector pins 58 and 60 which can be plugged into the first plug channels 30 and 32 of the cable channel 10 through the first surface 20. The contact pins 58 and 60 may be of partly insulated form. As can be seen from FIG. 2, when the seat electronic box 18 is plugged into the cable channel 10, the contact pins 58 and 60 contact the conductor rail 26 and the data line 28, respectively. Consequently, the seat electronic box 18 is detachably connected to the conductor rail 26 and the data line 28 via the contact pins 58 and 60. Thus, the seat electronic box 18 can be supplied with power from the power source 52 via the supply line 50, the connector plug 14 and the conductor rail 26, and can be supplied with data from the data source 56 via the supply line 54, the connector plug 16 and the data line 28.

Figure 3:
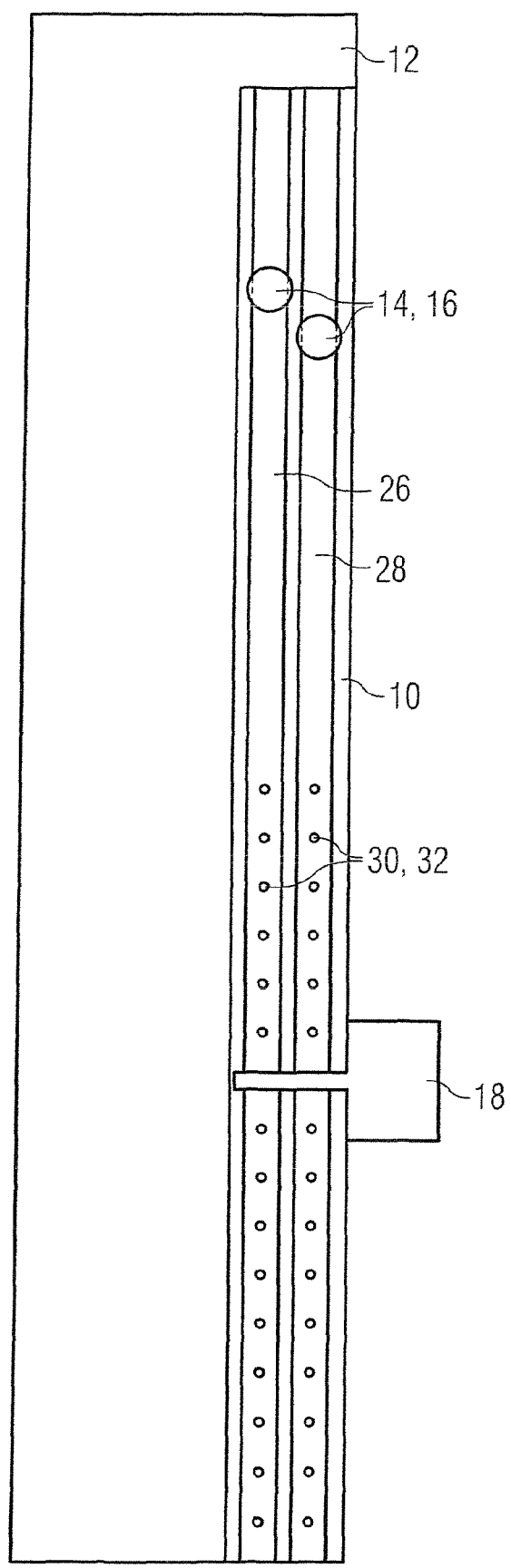
FIG. 3 shows a view from above of the line system of FIG. 2.

FIG. 3 shows the line system of FIG. 2 from above, i.e. a view from the interior of the aircraft cabin towards the floor panel 12. A multiplicity of first plug channels 30 and 32 are provided in the line channel 10 and they are provided, by way of example, with reference symbols 30 and 32 in FIG. 3. The first plug channels 30 and 32 run parallel to one another. In particular, the first plug channels 30 and 32 are arranged at equal spacings from one another, for example one-inch spacings, along the direction in which the line channel 10 extends. As a result, in the case of a new arrangement of passenger seats, measuring can be avoided. Correspondingly, a plurality of second plug channels 34 and 36 can also be provided in the line channel 10. It is also conceivable for in each case only one second plug channel 34 and 36 to be provided. As can be seen from FIG. 3, the connector plugs 14 and 16 are connected to the conductor rail 26 and the data line 28, respectively, at locations offset in the longitudinal direction. The connector plugs 14 and 16 may, however, also be arranged side by side.

Figure 4:
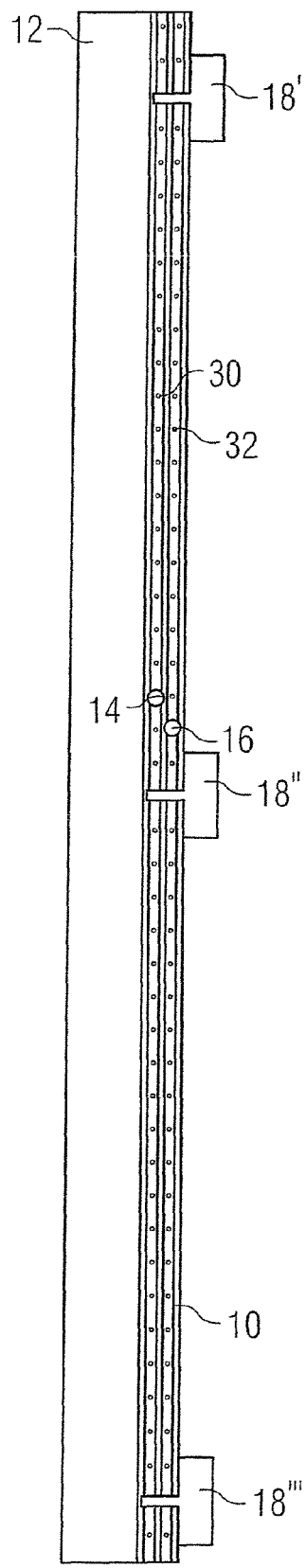
FIG. 4 shows a view from above of the line system of FIG. 2 with a plurality of seat electronic boxes according to a first passenger seat arrangement.
Figure 5:
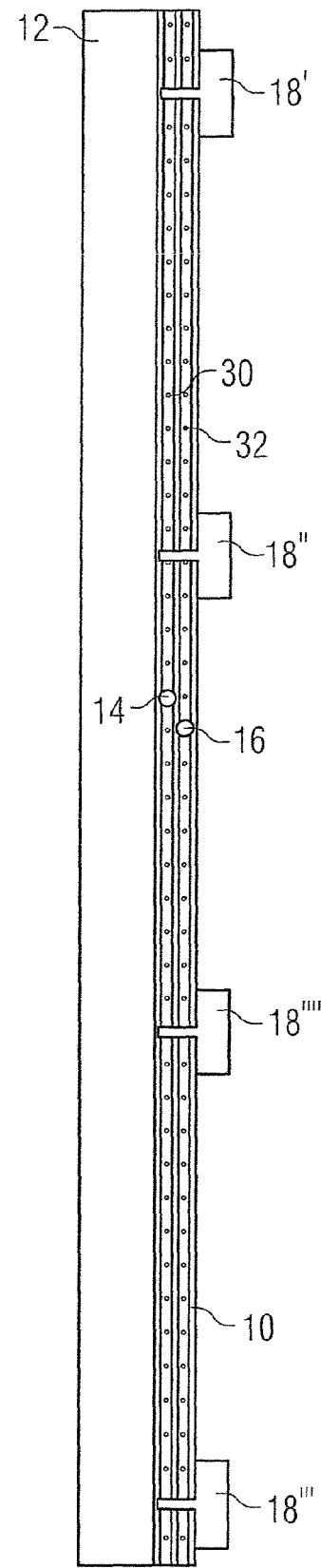
FIG. 5 shows a view from above of the line system of FIG. 2 with a plurality of seat electronic boxes according to a second passenger seat arrangement.

FIGS. 4 and 5 correspond to the embodiment of FIG. 3 and show line systems in a view from above with a plurality of seat electronic boxes 18', 18", 18''', 18'''' plugged into the line channel 10. The seat electronic boxes 18', 18", 18''', 18'''' are situated below respective passenger seats (not shown). In particular, one seat electronic box 18', 18", 18''', 18'''' can supply a group of passenger seats with power and data.

In the arrangement shown in FIG. 4, there is a relatively large spacing towards the front and towards the rear between neighbouring seat electronic boxes 18', 18", 18''', 18''''. The spacings between the passenger seats are correspondingly large. If an airline wishes to install a further row of passenger seats in the interior of the aircraft cabin, the seat electronic box 18" shown in FIG. 4 is unplugged from respective first plug channels 30 and 32 and plugged into respective other first plug channels 30 and 32 at the position shown in FIG. 5. Subsequently, an additional seat electronic box 18'''' for the additional row of passenger seats is plugged into corresponding first plug channels 30 and 32 shown in FIG. 5. The connector plugs 14 and 16 can remain unchanged here.

Consequently, the seat electronic boxes 18', 18", 18''', 18'''' can be adapted in a simple manner to different arrangements of passenger seats. In so doing, it is not necessary to replace or redesign the line channel 10. Furthermore, there is no need to make changes to the conductor rail 26, the data line 28 or the supply lines 50 and 54.

The invention claimed is:

1. A line system in an aircraft cabin, comprising:
   a line channel with a first outer surface facing toward the aircraft cabin and a second outer surface facing in an opposite direction with respect to the first outer surface and facing a floor panel,
   at least one conductor located in the line channel, the at least one conductor running substantially parallel to the second outer surface of the line channel,
   a plurality of first plug channels, each extended to the at least one conductor from the first outer surface,
   at least one second plug channel which extends to the at least one conductor from the second outer surface and
   at least one connector plug with an elongated contact pin which contacts the at least one conductor through the second plug channel, wherein the elongated contact pin includes a first portion and a second portion, the first portion of the elongated contact pin being situated in the second plug channel and the second portion of the elongated contact pin being situated outside the second plug channel.

2. The line system according to claim 1, wherein a second length of the second portion of the elongated contact pin is longer than a first length of the first portion of the elongated contact pin.

3. The line system according to claim 1, wherein the floor panel including an upper side and an underside, wherein the second outer surface of the line channel lies on the upper side, and the elongated contact pin extends through the floor panel to the at least one conductor.

4. The line system according to claim 3, wherein the connector plug further includes a plug body with a bearing surface which lies against the underside of the floor panel, the elongated contact pin projecting from the bearing surface such that a length of the second portion of the elongated contact pin is equal to to a thickness of the floor panel.

5. The line system according to claim 3, further comprising:
   a supply line which runs below the floor panel and feeds the conductor with power and/or data via the connector plug.

6. The line system according to claim 1, wherein the plurality of first plug channels are arranged at equal spacings along the line channel.

7. The line system according to claim 1, wherein the conductor has a substantially rectangular cross-section including longer, sides which are parallel to the second surface of the line channel.

8. The line system according to claim 1, further comprising:
   an electronic box for a passenger seat in the aircraft cabin with at least one connector pin, which detachably contacts the conductor through one of the first plug channels.

9. The line system according to claim 1, wherein the first surface is of convexly curved or plane form, and the second surface is of plane form.

10. The line system according to claim 1, wherein the first and/or the second plug channels run substantially perpendicularly to the second surface.

11. The line system according to claim 2, wherein the second length of the second portion of the elongated contact pin is at least twice as long as the first length of the first portion of the elongated contact pin.

12. The line system according to claim 11, wherein the second length of the second portion of the elongated contact pin is at least three times as long as the first length of the first portion of the elongated contact pin.

13. The line system according to claim 1, wherein the first surface is convexly curved, and the second surface is planar.

14. The line system according to claim 1, wherein the connector plug further includes a supply conductor which is formed as a pin and is arranged on a side of the connector plug facing away from the elongated contact pin.

15. The line system according to claim 1, wherein the at least one conductor running in the line channel comprises:
  a conductor rail running in the line channel, and a data line running in the line channel, wherein respective first and second plug channels and connector plugs are provided for the conductor rail and the data line.

16. The line system according to claim 1, wherein the plurality of first plug channels are spaced along a length of the line channel such that a plurality of electronic boxes for passenger seats in the aircraft cabin are each connected to the at least one conductor located in the line channel, to thereby receive electrical power and/or data delivered to the at least one conductor from the at least one connector plug.

17. A line system in an aircraft cabin, comprising:
  a line channel with a first outer surface facing toward the aircraft cabin and a second outer surface facing in an opposite direction with respect to the first outer surface,
  at least one conductor running in the line channel,
  a plurality of first plug channels, each extended to the at least one conductor from the first outer surface,
  at least one second plug channel which extends to the at least one conductor from the second outer surface and
  at least one connector plug with an elongated contact pin which contacts the at least one conductor through the second plug channel, wherein the elongated contact pin includes a first portion and a second portion, the first portion of the elongated contact pin being situated in the second plug channel and the second portion of the elongated contact pin being situated outside the second plug channel,
  wherein the connector plug further includes a supply conductor which is formed as a pin and is arranged on a side of the connector plug facing away from the elongated contact pin.

18. The line system according to claim 17, wherein the supply conductor is formed as a spring-loaded pin.

19. A line system in an aircraft cabin, comprising:
  a line channel with a first outer surface facing toward the aircraft cabin and a second outer surface facing in an opposite direction with respect to the first outer surface,
  at least one conductor running in the line channel,
  a plurality of first plug channels, each extended to the at least one conductor from the first outer surface,
  at least one second plug channel which extends to the at least one conductor from the second outer surface and
  at least one connector plug with an elongated contact pin which contacts the at least one conductor through the second plug channel, wherein the elongated contact pin includes a first portion and a second portion, the first portion of the elongated contact pin being situated in the second plug channel and the second portion of the elongated contact pin being situated outside the second plug channel,
  wherein the at least one conductor running in the line channel comprises, a conductor rail running in the line channel, and
  a data line running in the line channel, wherein respective first and second plug channels and connector plugs are provided for the conductor rail and the data line.

20. The line system according to claim 19, wherein the conductor rail and the data line run parallel to one another and equidistantly from the second surface.

* * * * *